United States Patent [19]
Kadunce et al.

[11] Patent Number: 5,748,155
[45] Date of Patent: May 5, 1998

[54] ON-GLASS ANTENNA AND CONNECTOR ARRANGEMENT

[75] Inventors: Randy R. Kadunce, New Kensington; Robert T. Shumaker, Jr., Manorville; Peter T. Dishart, Pittsburgh, all of Pa.

[73] Assignee: PPG Industries, Inc., Pittsburgh, Pa.

[21] Appl. No.: 527,593

[22] Filed: Sep. 13, 1995

[51] Int. Cl.$^6$ ........................... H01Q 1/32
[52] U.S. Cl. .............. 343/713; 343/704; 343/906
[58] Field of Search ...................... 343/713, 711, 343/712, 704, 906; 439/67, 916; H01Q 1/32

[56] References Cited

U.S. PATENT DOCUMENTS

| | | | |
|---|---|---|---|
| 3,615,986 | 10/1971 | Dickason et al. | 343/712 |
| 3,655,545 | 4/1972 | Gillery et al. | 204/192 |
| 3,962,488 | 6/1976 | Gillery | 427/109 |
| 3,987,449 | 10/1976 | DeAngelis et al. | 343/713 |
| 4,086,595 | 4/1978 | Cherenko et al. | 343/713 |
| 4,707,700 | 11/1987 | Nagy | 343/712 |
| 4,768,037 | 8/1988 | Inaba et al. | 343/713 |
| 4,849,766 | 7/1989 | Inaba et al. | 343/713 |
| 4,898,789 | 2/1990 | Finley | 428/623 |
| 5,083,135 | 1/1992 | Nagy et al. | 343/713 |
| 5,213,828 | 5/1993 | Winter et al. | 428/46 |
| 5,355,144 | 10/1994 | Walton et al. | 343/713 |
| 5,416,491 | 5/1995 | Nishikawa et al. | 343/713 |

*Primary Examiner*—Hoanganh T. Le
*Attorney, Agent, or Firm*—Andrew C. Siminerio

[57] ABSTRACT

The present invention discloses a glass antenna and connection arrangement. The antenna includes a first glass sheet having a notch area cut out along a portion of an edge of the first sheet, a second glass sheet secured in overlaying relation to the first sheet, and at least one electroconductive antenna element supported on the second sheet between the first and second sheets. The antenna element includes a portion that extends into the notch area. A connector is positioned within the notch area and filler material fills the notch area to secure the connector within the notch area and seal the notch area. The connector includes a first section which overlays the portion of the electroconductive antenna element extending within the notch area, a second section with selected portions which extend along and are secured to an outer major surface of the first sheet, and a third section which interconnects the first and second sections. A terminal assembly is positioned at an end of the second section to allow connection of the electroconductive element to an external transmitting and/or receiving device, e.g. a radio, cellular phone or global positioning system.

25 Claims, 2 Drawing Sheets

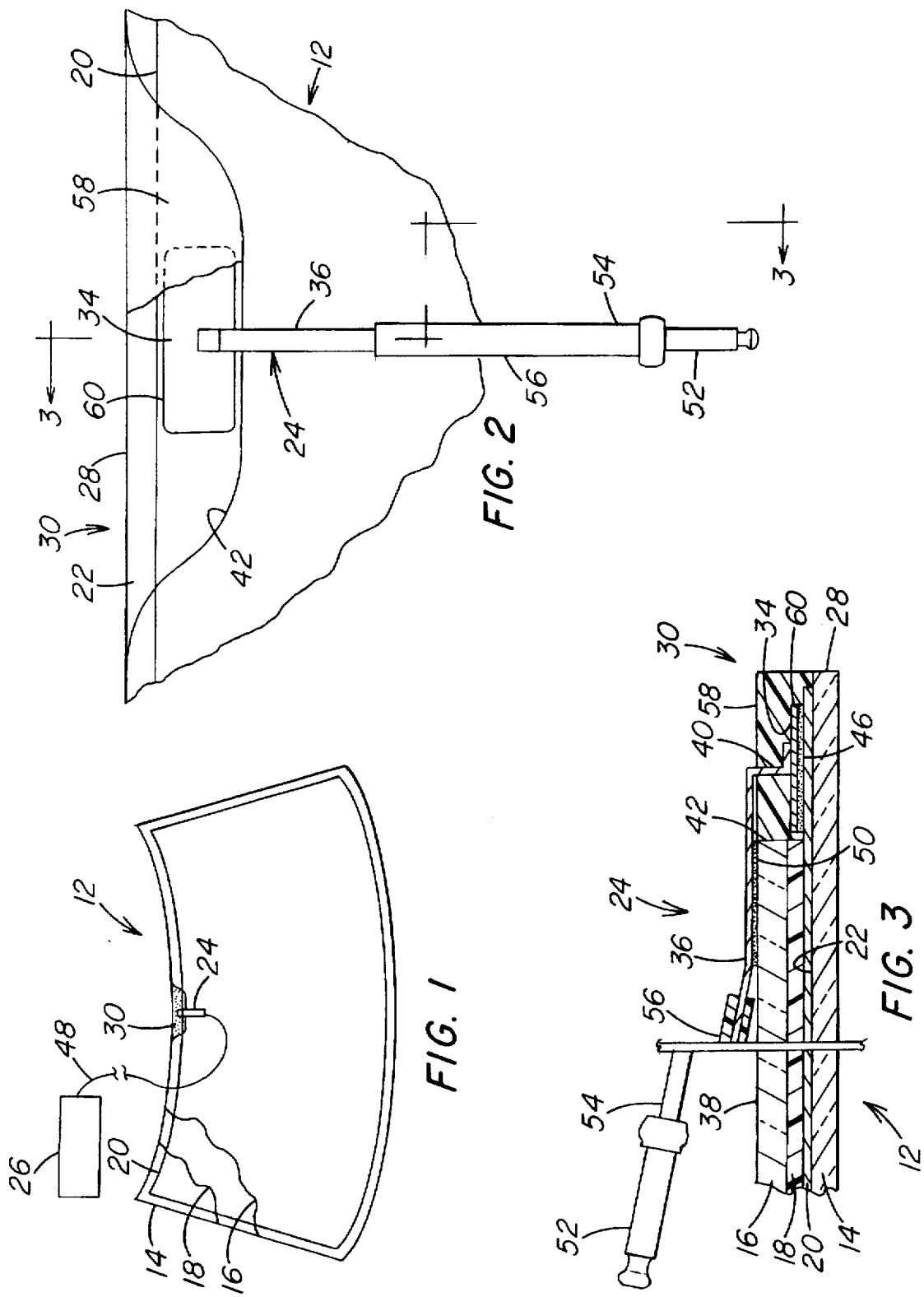

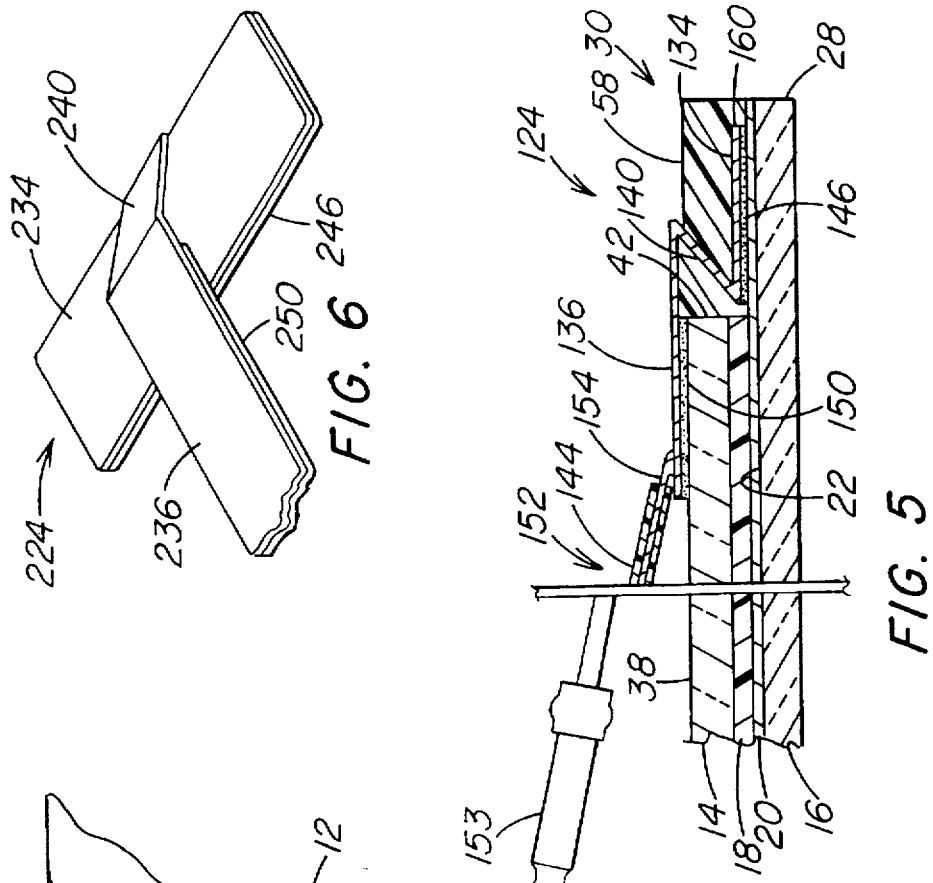
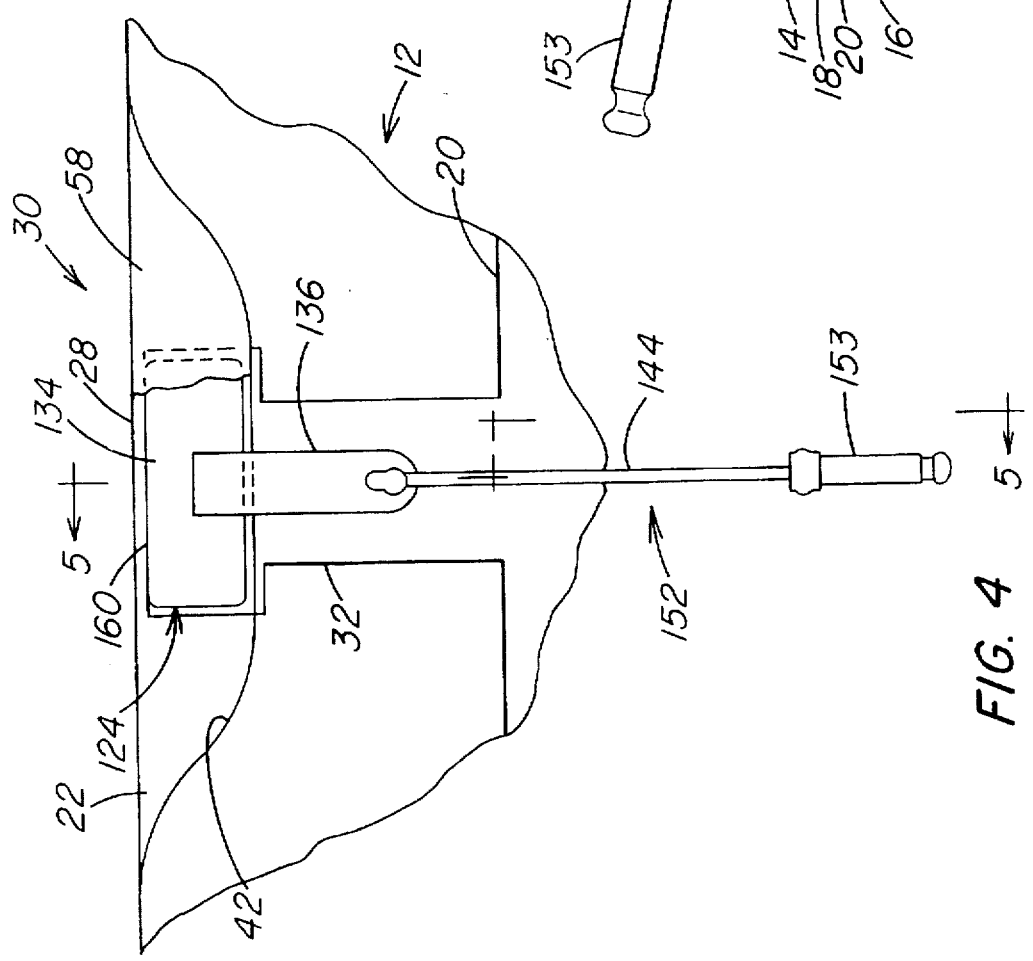

ON-GLASS ANTENNA AND CONNECTOR ARRANGEMENT

BACKGROUND OF THE INVENTION

The present invention relates to vehicle antennas and in particular to an antenna formed by a transparent coating laminated between two glass plies and an electrical connection arrangement for connecting the antenna to a radio or other transmitting/receiving device.

In the past, the traditional motor vehicle antenna for receiving and transmitting radio signals was a mast or whip-type antenna. There has been a recent trend to incorporate the antenna into the vehicle structure. For example, U.S. Pat. No. 3,987,449 to DeAngelis et al. discloses a wire antenna laminated within a vehicle windshield. U.S. Pat. No. 4,707,700 to Nagy positions an antenna within the roof structure of a vehicle. U.S. Pat. No. 5,416,491 to Nishikawa et al. forms antenna elements on a window using electroconductive ceramic paints. U.S. Pats. Nos. 4,768,037 and 4,849,766 to Inaba et al. and U.S. Pat. No. 5,355,144 to Walton et al. use a transparent electroconductive coating laminated between two glass plies to form an antenna. U.S. Pat. No. 5,083,135 to Nagy et al. utilizes a transparent coating in the form of a "T" to form an antenna. In each system, the connector arrangement conducts the radio wave signals received by the antenna to a receiver, for example a radio.

In order to link the antenna element and an external device, connectors, such as wires, braids or metal tabs, have been used. Problems arise when these elements are laminated within the transparency to make electrical contact with an antenna element. In particular, it has been found that when incorporating these types of connectors between the plies of the laminate, air may be entrapped in the laminate in the vicinity of the connector. It is believed that the connector hinders de-airing of the laminate during a conventional roll prepress operation. The bubbles formed by the entrapped air detract from the aesthetics of the window as well as increase the possibility of windshield delamination at or near the connector. U.S. Pat. No. 5,213,828 to Winter et al. addressed this problem in an electrically heatable windshield where electrical connection was required to be made to electroconductive elements within the windshield. A notch was formed along the edge of the windshield and silver ceramic enamel leads from the windshield bus bar system were extended to the notch area. Wires could then be soldered directly to the leads within the notch. However, it was found that during lamination, air would be forced through these porous enamel leads and into the laminate resulting in bubble formation near the notch area. To prevent this, prior to laminating, the ceramic leads were sealed, for example by filling the notch area with sealant. This prevented the bubble formation near the notch area of the laminate.

It would be advantageous to provide an antenna arrangement having a connector that is positioned external to the laminate and electrically interconnects the antenna to a radio or electromagnetic energy transmitting and/or receiving device while maintaining the aesthetics of the window by eliminating bubble formation in the vicinity of the connection area.

SUMMARY OF THE INVENTION

The present invention discloses a glass antenna and connection arrangement. The antenna includes a first glass sheet having a notch area cut out along a portion of an edge of the first sheet, a second glass sheet secured in overlaying relation to the first sheet, and at least one electroconductive antenna element supported on the second sheet between the first and second sheets. The antenna element includes a portion that extends into the notch area. A connector is positioned within the notch area and filler material fills the notch area to secure the connector within the notch area and seal the notch area. The connector includes a first section which overlays the portion of the electroconductive antenna element extending within the notch area, a second section with selected portions which extend along and are secured to an outer major surface of the first sheet, and a third section which interconnects the first and second sections. A terminal assembly is positioned at an end of the second section to allow connection of the electroconductive element to an external transmitting and/or receiving device, e.g. a radio, cellular phone or global positioning system.

The present invention also discloses a connector for electrically connecting an electroconductive element of a laminate to an external device. The connector includes a flat, electroconductive pad portion which overlays an electroconductive element of the laminate and has a first adhesive along a surface of the first portion, a terminal portion offset from the pad portion and having a second adhesive positioned along selected sections of the terminal portion, and a connecting portion interconnecting the pad portion and said terminal portion. The adhesive along the pad portion may be an electrically conductive or non-conductive adhesive. In one particular embodiment of the invention, the pad, terminal and connector portions are all integral with each other and the connector portion is skewed relative to the pad and terminal portions to form a "Z" shaped connector.

BRIEF DESCRIPTION OF THE DRAWINGS

FIG. 1 is a plan view of a transparent glass antenna incorporating features of the present invention.

FIG. 2 is an enlarged plan view of the antenna and connector of the present invention illustrated in FIG. 1, with portions removed for clarity.

FIG. 3 is a view taken along line 3—3 of FIG. 2.

FIG. 4 is a plan view similar to that shown in FIG. 2 of an alternate embodiment of the invention.

FIG. 5 is a view taken along line 5—5 of FIG. 4.

FIG. 6 is an isometric view of an alternate connector configuration.

DETAILED DESCRIPTION OF THE INVENTION

The present invention is disclosed in combination with an antenna system for an electromagnetic energy transmitting and/or receiving device. However it should be appreciated that the present invention may be used in combination with other types of systems that require electrical connection to conductive elements within a laminate, for example connection to a glass sheet heating system.

FIG. 1 illustrates an antenna incorporating the features of the present invention. More specifically, a laminated vehicle windshield 12 is formed by outer and inner glass plies 14 and 16, respectively, bonded together by a plastic interlayer 18, preferably polyvinyl butyral. Plies 14 and 16 may be other transparent rigid materials, for example polycarbonate, or a combination of different transparent, rigid materials. Windshield 12 further includes at least one antenna element 20. In the particular embodiment of the invention illustrated in FIG. 1, the antenna element 20 is a transparent electroconductive coating applied on surface 22 of glass ply 14 in any manner well known in the art, and generally occupies the central portion of the windshield 12. The coating may be a single or multilayered metal containing coating, for example as disclosed in U.S. Pat. Nos. 3,655,545 to Gillery et al.; 3,962,488 to Gillery; and 4,898,789 to Finley. It should be appreciated that the antenna element 20 may have a configuration different from that shown in FIG. 1. For example, element 20 may be T-shaped as shown in U.S. Pat. No. 5,083,135 or may include multiple antenna elements that are either directly or indirectly electrically interconnected.

Although it is preferred that antenna element 20 be a transparent coating, if the antenna element is not positioned in the major vision area of the windshield 12 or does not obstruct the main viewing area of the vehicle transparency, antenna element 20 may be a nontransparent electroconductive material, for example silver-containing ceramic paint, metal foil, etc. In addition, the antenna includes a combination of coating, wire and/or ceramic antenna elements.

With continued reference to FIG. 1, antenna element 20 in this particular configuration is basically quadrilateral in shape and preferably spaced from the peripheral edge of the windshield 12. The exact shape and position of element 20 as well as the addition of any other antenna elements depends in part on the design of the vehicle into which the windshield 12 is installed, the angle of windshield installation, the coating resistivity, the type of signal to be transmitted or received and the desired performance of the antenna. These types of design considerations for a transparent glass antenna are discussed in U.S. Pat. Nos. 4,768,037; 4,849,766 and 5,083,135.

A connector 24 provides a connection between the antenna element 20 and an electromagnetic energy transmitting and/or receiving device 26 (shown only in FIG. 1). Device 26 may be a radio, cellular phone, television, global positioning system or any other type of system that uses antenna element 20 to transmit and/or receive signals. Although not required, in the particular embodiment shown in FIG. 1, the connector 24 is positioned along the upper edge 28 of the windshield 12. The connection between the connector 24 and antenna element 20 is configured such that the connector 24 is not laminated between plies 14 and 16. In this manner, the problem of entrapped air resulting from a connector being laminated within the windshield is eliminated. More specifically, a notch 30 is cut out of the inner ply 16 along the upper edge 28 of the windshield 12. A corresponding section of the interlayer 18 is also removed from the notch area 30. Connector 24 is secured to a portion of the antenna element 20 that extends into the notch area 30. In the particular embodiment of the invention illustrated in FIG. 2, the notch area is of sufficient depth and antenna element 20 extends close enough to the edge 28 of the windshield 12 such that a portion of antenna element 20 passes through the notch area 30, allowing the connector 24 to be secured directly to the element 20. In order to reduce the amount of sealant needed to fill the notch area 30, as will be discussed later in more detail, and maintain structural integrity of the windshield 12, it is preferred that the size of the notch area 30 be kept to a minimum. In addition, in order to produce optimal antenna performance, the particular antenna element pattern may require that the antenna element 20 be spaced several inches from the edge 28 of the windshield 12. In such a situation, the antenna element 20 may include an extension 32 which extends the antenna element 20 into the notch area 30 and provides an arrangement whereby the connector 24 may be electrically interconnected to the antenna element 20 at the notch area 30 through extension 32, as shown in FIGS. 4 and 5. Although not required, the extension 32 may be made of the same material as element 20. It is believed that when the portion of antenna element 20 or extension 32 within the notch area 30 is a transparent electroconductive coating, the problem of air being forced into the windshield 12 through antenna element 20 or extension 32 is eliminated since the combination of the coating composition and thickness will not result in air permeable interface along the edge of the notch area 30 through which air will pass during a lamination process. Within notch are 30, the element 20 or extension 32 should not extend to the edge 28 of the windshield 12 but rather should terminate at least 1 mm from the edge 28. This will ensure that the coating is completely sealed within the notch area 30, as will be discussed later, and will inhibit coating degradation along edge 28.

Connector 24 is preferably fabricated from stainless steel, copper, tin, brass or any other electroconductive material. If required, combinations of materials, such as stainless steel or brass coated with copper, tin or silver, ay be used to enhance conductivity and strength. Referring to FIG. 3, connector 24 includes a pad section 34 which overlays and is in electrical contact with a portion of the antenna element 20, a terminal section 36 which is offset from section 34 and extends along a portion of surface 38 of ply 16, and a connecting section 40 which interconnects sections 34 and 36. Terminal section 36 includes an assembly for connecting the antenna element 20 to the transmitting/receiving device 26, as will discussed later in more detail, and at least a portion of terminal section 36 is substantially parallel to the pad section 34. The electrical contact made by section 34 may be a direct connection or a capacitive connection, as will be discussed later in more detail. Section 40 may extend generally perpendicularly between to these sections as shown in FIG. 3, or may be slanted between these sections and inclined relative to edge 42 of notch area 30. In the particular embodiment of the invention illustrated in FIGS. 2 and 3, sections 36 and 40 are formed by a flat wire soldered to section 34. The flat wire may be replaced with a conventional round wire; however, it is believed that the flat wire provides a lower profile along the windshield surface and is less likely to interfere with a windshield adhesive and mounting system. If desired, sections 36 and 40 may be formed integrally with section 34 as shown with sections 134, 136 and 140 in FIGS. 4 and 5, which will be discussed later in more detail.

In determining the dimensions of connector 24, the surface and cross-section areas must be sufficient to provide the required electrical connectivity between the antenna element 20 and the transmitting/receiving device 26. More particularly, if the surface area of section 34 of connector 24 is too small or the cross-sectional areas of the remaining sections it too low, the signal loss through the connector 24 will not allow the desired current flow to pass from antenna element 20 to the transmitting/receiving device 26 through connector 24.

An adhesive 46 (shown only in FIG. 3) is applied to section 34 to secure the connector 24 to antenna element 20 on outer glass ply 14. As discussed earlier, the electrical connection between the connector 24 and element 20 may be either a direct connection or a capacitive connection. More particularly, the adhesive may be electrically conductive to provide a direct electrical connection between connector 24 and antenna element 20, or it may be nonconductive so that the electrical connection is capacitive. It has been found that a capacitive connection may be used to produce a capacitive reactance that matches the inductive reactance of the antenna to a coaxial cable 48 (shown only in FIG. 1) used to connect the antenna element 20 to the transmitting/receiving device 26, by minimizing the net reactive component as disclosed in U.S. Pat. No. 5,355,144. The required surface area of the section 34 is based, in part, on the spacing between connector 24 and antenna elements 20, i.e. the adhesive thickness, the types of materials used for the antenna element, connector and adhesive, and the desired type of connection, i.e. direct or capacitive. In instances where there is direct electrical connection between connector 24 and element 20, it may be desirable to have the surface area provided by pad section 34 large enough so that in the event the conductive adhesive 46 fails, the connector 24 may still maintain a capacitive connection that permits the continued operation of antenna element 20. If desired, colorants may be the adhesive 46 to hide the connector 24 when viewed through the outer surface of the windshield 12.

Terminal section 36 extends along a portion of surface 38 of inner ply 16, substantially parallel to pad section 34. If desired, an adhesive 50 (shown only in FIG. 3) may be applied to a selected portion of the lower surface of section 36 to secure it to surface 38 of inner ply 16 and hold connector 24 in place. By keeping section 36 secured to the windshield 12 surface, it reduces the possibility that the connector 24 will be damaged during handing or installation of the windshield and reduces the possibility of connector 24 interfering with the windshield adhesive and mounting system. A terminal assembly 52, for example a reinforced spade assembly, a male JASO pin as shown in FIG. 3, or other electrical connecting device as is well known in the art, is connected to end 54 of section 36 so that the coaxial cable 48 may be easily secured to connector 24. The portion of section 36 not secured to surface 38 may be covered with a nonconductive shrink-wrap 56 to prevent this portion of the connector 24 from contacting the vehicle and adversely effecting the performance of the antenna, as shown in FIGS. 2 and 3. The portion of connector 24 or terminal 52 where the terminal 52 is secured to section 36 may be reinforced or enlarged to make it easier to handle the terminal 52 and connect it to cable 48.

The notch area 30 is filled with a sealant 58 to protect and further secure the connector 24 in place, to seal the portion of the antenna element 20 within notch area 30 and to seal the exposed edge 42 of the notch area 30 by forming a moisture barrier. The sealant 58 is preferably a room temperature curable material that may be injected into the notch area 30. In addition, if the sealant is applied prior to lamination of the windshield 12, it must be able to survive the elevated temperatures and pressures of the laminating cycle. Furthermore, the sealant material preferably should not give off any toxic fumes or gases and should not adversely effect the materials forming the antenna element 20 in a manner that will electrically isolate the connector 24 from the antenna 10. Sealants that have been used to fill and seal the notch area 30 include room temperature curable epoxies, such as Plastilok® 421 epoxy available from BF Goodrich, Adhesives Systems Division, Akron, Ohio and Scotch-Weld® DP-110 epoxy available from 3M Industrial Tape and Specialty Division, St. Paul, Minn., both of which are two-part flexible epoxy sealants. In addition, hot-melt adhesives such as Hysol 7811 adhesive available from Hysol Engineering Adhesives, Seabrook, N. H., which is a polyamide resin adhesive have also been used. Hot melt adhesives are softened for application by heating and subsequently reharden when cooled.

It should be appreciated that the notch area 30 must be large enough to accommodate the connector 24 as well as provide sufficient direct contact between the sealant 58 and outer glass ply 14 to provide a good bond and prevent the sealant 58 from being pulled out of the notch area 30. In addition, there should be sufficient spacing between edge 60 of the connector 24 and edge 28 of the windshield 12 to ensure that the sealant 58 extends beyond edge 60 to completely seal connector 24 and provide a continuous moisture barrier along edge 28. The spacing between edge 60 of connector 24 and edge 28 of the windshield 12 should be at least 1 mm, and preferably 3mm.

In practice it has been observed that when the connector 24 is applied after lamination, a small amount of interlayer 18 is squeezed into the notch area 30 along edge 42, preventing connector 24 from being placed directly against edge 42. As a result, in order to ensure adequate spacing between edge 28 of the windshield and edge 60 of the connector, notch 30 must be sufficiently deep to accommodate both the interlayer and connector 24 or the interlayer extending into the notch area 30 after lamination should be removed. When the latter procedure is followed, care must be taken to avoid effecting the antenna element 20 along the edge 42 of notch area 30 in such a way that it becomes electrically isolated from the remaining portion of the antenna element 20. As an alternative, the interlayer along the notch edge 30 may be cut prior to assembly of the windshield 12 such that the removed section of interlayer is slightly larger than the notch area 30. In this fashion, as the interlayer is heated and squeezed during lamination, it will not flow into the notch area 30.

FIGS. 4 and 5 illustrate another embodiment of the present invention. In this particular embodiment, antenna element 20 is spaced from notch area 30, and extension 32 extends from element 20 into the notch area 30. Connector 124 includes pad section 134, offset terminal section 136 and connecting section 140 which are all integral with each other. Since all the sections are integral and continuous, there is no need to solder section 140 to pad section 134, which avoids the potential problem of warping section 134. The length of section 136 may be shortened as compared to section 36 in connector 24 and replaced with a terminal assembly 152 that includes an insulated wire 144 soldered to end 154 of section 136 and a JASO pin 153 or other terminal device secured to the opposite end of wire 144. Although connecting section 140 may extend generally perpendicular between pad section 134 and terminal section 136, in one embodiment of connector 124, at least a portion of section 140 is skewed, i.e. slanted relative to sections 134 and 136 so that when connector 124 is positioned on outer ply 14 within notch area 30, such portion of section 140 inclined within notch area 30. In the particular configuration illustrated in FIGS. 4 and 5, section 140 forms a "Z" shaped configuration. This type of connector configuration makes it easier to inject sealant between section 140 and edge 42 of the notch area 30 and better seal the notch area 30 by ensuring that there is sealant between section 140 and edge 42. In addition, the inclined configuration of section 140 will also allow for variations in the combined thickness of the inner glass ply 16 and interlayer 18. Adhesive 146 secures section 134 to the extension 32 and adhesive 150 secures section 136 to surface 38 of inner ply 16. As shown in FIG. 5, at least a portion of terminal section 136 is substantially parallel to pad section 134. Connector 124 may be initially formed to this configuration or it may be formed when adhesives 146 and 150 secure connector 124 in place.

It should be appreciated that other connector shapes which provide for easier application of the sealant and allow for variations in glass and interlayer thicknesses as discussed above with respect to connector 124 may also be used. For example, without limiting the present invention, FIG. 6 illustrates another embodiment of the connector. More specifically, connector 224 includes a pad section 234, terminal section 236 and connecting section 240. As with connector 124, the sections in connector 224 are integral with each other and there is no soldering or adhesive required to interconnect the sections. Connecting section 240 is skewed relative to sections 234 and 236 to allow for variations in the combined thickness of the inner glass ply and interlayer. Adhesives 246 and 250 secure sections 234 and 236 to the extension 32 (or antenna element 20) and surface 38 of inner ply 16, respectively (extension 32 and surface 38 of inner ply 16 are not shown in FIG. 6). A terminal assembly (not shown) is secured to the end of terminal section 236.

The connectors 24,124 and 224 are preferably made from tin plated brass or tin plated stainless steel with a base metal thickness ranging from 0.002 to 0.02 in. (0.051 to 0.51 mm), and more preferably ranging from 0.005 to 0.007 in. (0.13 to 0.18 mm). Adhesives 46, 50,146, 150, 246 and 250 may be a double-face tape, adhesive spray or any other type of adhesive system well known in the art. The thickness of adhesive layers 46,146 and 246 are generally less than that of adhesive layers 50,150 and 250 since section 34 and adhesive 46 of connector 24, section 134 and adhesive 146 in connector 124, and section 234 and adhesive 246 in connector 224 will be covered by sealant 58. It is preferred that the adhesive layers be applied as a double-faced tape having a thickness ranging from about 0.001 to 0.01 in. (0.025 to 0.25 mm), and more preferably 0.002 to 0.005 in. (0.051 to 0.13 mm). When unplated connectors are used, and in particular, stainless steel connectors, it may be required to buff the lower surface of sections 34,134 and 234 with an abrasive prior to applying the adhesive to remove any oxide layer and ensure good electrical contact between the connectors 24, 124 and 224 and antenna element 20 or extension 32.

It should be appreciated that thicker base metal and/or adhesive may be used for the connector. For example, the present invention contemplates using a base metal thickness of up to 0.125 in. (0.32 cm) or greater, to form a rigid connector configuration. However, the use of thinner material reduces material costs, allows the connectors to be more easily stamped and formed, and provides a more flexible structure that allows the connector to conform to variations in the structure of windshield 12. Similarly, the use of a thinner adhesive may also result in reduced material cost. In addition, as discussed earlier, since the connector is being positioned along an edge of the windshield 12, care should be taken to avoid having the connector interfere with the windshield adhesive and mounting system. To this end, it is preferred that the total combined thickness of section 136 and adhesive 150 on connector 124 not exceed 0.04 in. (1 mm) and preferably not exceed 0.03 in. (0.75 mm).

In one particular embodiment of the invention, the antenna element 20 was a transparent, electroconductive multilayered coating centered on surface 22 of glass ply 14 within the main viewing area of the windshield 12 and having a resistivity of approximately 3 ohms per square. The spacing of the edge of the coating to the edge of the windshield 12 varied with a minimum spacing between the coating and the metal frame (not shown) surrounding the windshield 12 of 0.25 inches (6.4 mm). Antenna element 20 was spaced from edge 28 of windshield 12 and did not pass through the notch area 30. As a result, an extension 32 was used to bridge the space between the antenna element 20 and the notch area 30 as shown in FIG. 4. Extension 32 was a coating identical to and applied at the same time as the antenna element 20. Extension 32 was 0.98 in. (25 mm) wide and widened to 1.38 in. (35 mm) near edge 28 to accommodate the full width of section 134 of connector 124, which is discussed below. Although not required, it is preferred that the connector 124 be positioned in the central portion of the windshield 12, i.e. within the central third of the windshield 12 and more preferably at the center of windshield 12. The notch area 30 was approximately 0.47 in. (12 mm) deep and 3.93 in. (100 mm) wide. The connector was of the type illustrated in FIGS. 4 and 5. More specifically, connector 124 was a stainless steel member approximately 0.005 in. (0.127 mm) thick throughout. Section 134 was 0.39×1.18 in. (10×30 mm) and positioned so that section 134 was as close to edge 42 of the notch area 30 as possible. There was at least one millimeter between edge 160 of section 134 and edge 28 of the windshield 12. This distance varied depending on the amount of interlayer 18 extending into the notch area 30 along edge 42 as a result of the laminating process.

The adhesive 146 on section 134 was a double-sided electrically conductive adhesive tape approximately 0.002 in. (0.051 mm) thick, for example Product No. CD9082, available from Specialty Tapes, Racine, Wis. As an alternative, a non-electrically conductive adhesive, for example Product No. 9482, available from 3M Company, St. Paul, Minn., may be used to secure section 134 to the extension 32 (or element 20). In this particular embodiment of the invention, the effective height of the connector 124 was 0.137 in. (3.48 mm) which is the approximate combined thickness of inner ply 16 and interlayer 18. A double-sided, electrically nonconductive tape adhesive 150 such as 3M Company Product No. 9485 was applied to section 136 at a thickness of approximately 0.005 in. (0.127 mm) to secure this portion of the connector 124 to surface 38 of inner ply 16. Sections 136 and 140 were 0.25 in. (6.4 mm) wide and section 136 was 1.14 in. (29 mm) long measured from end 154 to section 140, with about 0.94 in. (24 mm) of section 136 being secured to surface 38 of inner ply 16. In this particular embodiment, the terminal assembly 152 included an 18-gauge insulated wire 144 soldered to end 154 of section 136 and a JASO pin 153 secured to the end of the wire. The notch area 30 was filled with Scotch-Weld DP-110 epoxy. This particular sealant was modified by adding silane, e.g. Dow Corning®Z-6040 silane, available from Dow Corning, Midland, Mich. to the epoxy resin component in an amount equal to approximately 0.2–8 wt.% of the resin, and preferably 0.5-2 wt.%. In addition, carbon black, for example Arospere™ 11V carbon black available from J. M. Huber Corporation, Borger, Tex., was added to "hide" the connector 124 by providing a black appearance consistent with a black ceramic border (not shown) which is typically applied about the marginal edge portion of an automotive vehicle windshield. In this particular embodiment, the carbon black was added to the accelerator component in an amount equal to approximately 1–1.5 wt.% of the accelerator. The sealant was applied using a static mix applicator that mixed equal amounts of the two-part epoxy immediately prior to its injection into the notch area 30. As applied, the sealant sets up in about 15 minutes so that it could be handled more easily. If desired, the epoxy could be heated after application to reduce its set and cure time.

It should be appreciated that the size of the notch area 30 and/or connectors 24, 124 and 224 may be modified to further space the connector from the edge 28 of the windshield 12. For example, pad section 134 of connector 124 may be 0.31×1.18 in. (8×30 mm). With a 0.47 in. (12 mm) deep notch area 30 as discussed earlier, this provides a 4 mm spacing between the connector and the edge 28. If this size section does not provide the area required to obtain the desired electrical connection between connector 124 and extension 32 and it is desired to maintain additional edge spacing, the length of the connector could be increased and/or the width of the connector and the depth of the notch area could be increased. For example, to maintain the same effective area as a 0.39×1.18 in. (10×30 mm) pad section, the pad size may be increased to 0.31×1.46 in. (8×37 mm) with the coating width of extension 32 increased proportionately to ensure that the entire surface of section 134 contacts extension 32. In addition the depth of the notch area 30 may be increased to further space the edge of the connector from the edge 28 of the windshield 12.

In fabricating the windshield 12 described above, the transparent electroconductive coating was applied to glass ply 14 in any manner well known in the art. Ply 14 was masked to provide the desired antenna pattern. As an alternative, the entire surface 22 of ply 14 may be coated and thereafter selected portions of the coating removed to provide the desired antenna pattern. After coating, ply 14 was combined with ply 16 and the two plies were shaped simultaneously by techniques well known in the art, for example gravity sag bending. If desired, ply 14 may be shaped prior to applying the antenna elements 20. After shaping, the interlayer 18 was inserted between plies 14 and 16 and the assembly was laminated using techniques well known in the art, to form a unitary structure. After laminating, the connector 124 was positioned within notch 30 and adhered to extension 32 by adhesive layer 146. Sealant 58 was then injected into the notch area 30, sealing the edge of the windshield 12 and firmly securing connector 124 in place. Although not limiting in the present invention, a piece of polyester tape (not shown) may be used to cover the notch area 30 along surface 38, with the sealant 58 being injected into the space between the tape and surface 22 of inner ply 16.

Although the invention as discussed above included only one electrical connection to the antenna element 20, it should be appreciated that multiple connections to the antenna element 20 may be made along one or several edges of the windshield 12.

As discussed earlier, the electrical connection as taught herein may be applied to the windshield 12 either before or after lamination. When applied before lamination, the heat from the laminating operation may be used to cure the sealant. When the connection is made after lamination, the problem of applying the connector to a defective windshield may be avoided.

The invention described and illustrated herein represents a description of illustrative preferred embodiments thereof. It is understood that various changes may be made without departing from the gist of the invention defined by the claims that follow.

We claim:

1. A glass antenna comprising:
   a first glass sheet having a notch area cut out along a portion of an edge;
   second glass sheet secured in overlaying relation to said first sheet;
   a transparent, electroconductive coating supported on an inner major surface of said second sheet between said first and second sheets forming at least one transparent electroconductive antenna element, said electroconductive coating further having a coating portion which extends within said notch area;
   a connector having a first section secured to said inner major surface of said second sheet and overlaying an area of said coating portion of said electroconductive coating within said notch area, a second section with selected portions extending along an outer major surface of said first sheet, and a third section extending through said notch area and interconnecting said first and second sections;
   filler material within said notch area to secure said connector within said notch area and to seal said notch area, wherein said first and third sections of said connector are sealed within said filler material; and
   a terminal assembly positioned at an end of said second section to allow connection of said electroconductive coating to a transmitting and/or receiving device.

2. The antenna as in claim 1 further including means to secure at least a portion of said second section of said connector to said outer major surface of said first sheet.

3. The antenna as in claim 2 wherein at least a portion of said third section of said connector is skewed relative to said first and second sections.

4. The antenna as in claim 1 wherein said first section of said connector is in direct electrical contact with said coating of said electroconductive coating portion.

5. The antenna as in claim 4 further including an electrically conductive adhesive on said first section of said connector to provide said direct electrical contact with said electroconductive coating.

6. The antenna as in claim 1 wherein said first section of said connector is capacitively connected to said coating of said electroconductive coating portion.

7. The antenna as in claim 6 further including an electrically non-conductive adhesive on said first section of said connector to provide said capacitive electrical connection between said connector and said electroconductive coating.

8. The antenna as in claim 1 wherein said filler material is a flexible epoxy material.

9. The antenna as in claim 1 wherein said connector is spaced a minimum of 1 mm from an edge of said second sheet in said notch area.

10. The antenna as in claim 1 wherein at least a portion of said third section of said connector is skewed relative to said first and second sections.

11. The antenna as in claim 1 wherein said first section of said connector is a flat, electroconductive pad portion which overlays selected areas of said coating portion of said electroconductive coating, said second portion of said connector is a terminal portion offset from said pad portion and said third portion of said connector is a connecting portion extending through said notch area and interconnecting said pad portion and said terminal portion, and wherein said connector further includes a first adhesive applied along a major surface of said pad portion and a second adhesive applied along selected sections of said terminal portion.

12. The antenna as in claim 11 wherein said pad portion, said terminal portion and said connecting portion of said connector are integral with each other.

13. The antenna as in claim 12 wherein said connector is a flexible metal member and said pad, terminal and connecting portions of said connector have a thickness ranging from about 0.002 to 0.02 in.

14. The antenna as in claim 13 wherein said connector has a thickness ranging from about 0.005 to 0.007 in.

15. The antenna as in claim 13 wherein said first and second adhesives of said connector have a thickness ranging from about 0.001 to 0.01 in.

16. The antenna as in claim 15 wherein said first and second adhesives of said connector have a thickness ranging from about 0.002 to 0.005 in.

17. The antenna as in claim 15 wherein said connecting portion of said connector is skewed relative to said pad and terminal portions.

18. The antenna as in claim 11 wherein said pad portion and said selected sections of said terminal portion of said connector are substantially parallel to each other.

19. The antenna as in claim 18 wherein said selected sections of said terminal portion and said second adhesive of said connector have a combined thickness of no more than 0.04 in.

20. The antenna as in claim 11 wherein said connecting portion of said connector is skewed relative to said pad and terminal portions.

21. The antenna as in claim 11 wherein said first adhesive of said connector is an electrically conductive adhesive.

22. The antenna as in claim 11 wherein said first adhesive of said connector is an electrically non-conductive adhesive.

23. The antenna as in claim 11 wherein a wire secured to said pad section of said connector forms said connecting and terminal portions of said connector.

24. The antenna as in claim 11 further including a terminal assembly secured to an end of said terminal section of said connector.

25. A glass antenna comprising:

a first glass sheet having a notch area cut out along a portion of an edge;

a second glass sheet secured in overlaying relation to said first sheet;

a transparent, electroconductive coating supported on said second sheet between said first and second sheets forming at least one transparent electroconductive antenna element, said electroconductive coating further having a coating portion which extends within said notch area;

a connector having a flat, electroconductive pad portion overlaying sections of said coating portion of said electroconductive coating within said notch area, a terminal portion offset from said pad portion with sections extending along an outer major surface of said first sheet, and a connecting portion extending angularly from said pad portion through said notch area to interconnect said pad portion with said terminal portion;

filler material within said notch area to secure said connector within said notch area and to seal said notch area, wherein said pad portion and said connecting portion are sealed within said filler material; and terminal assembly positioned at an end of said terminal portion to allow connection of said electroconductive coating to a transmitting and/or receiving device.

* * * * *

UNITED STATES PATENT AND TRADEMARK OFFICE
CERTIFICATE OF CORRECTION

PATENT : 5,748,155

DATED : May 5, 1998

INVENTOR(S) : Randy R. Kadunce et al

It is certified that error appears in the above-identified patent and that said Letters Patent is hereby corrected as shown below:

On the title page, item [54], line 1, change the title from "ON-GLASS ANTENNA AND CONNECTOR ARRANGEMENT" to --ANTENNA AND CONNECTOR ARRANGEMENT--.

Signed and Sealed this

Twenty-first Day of March, 2000

Attest:

Q. TODD DICKINSON

Attesting Officer

Commissioner of Patents and Trademarks